US011047975B2

(12) United States Patent
Zhou et al.

(10) Patent No.: US 11,047,975 B2
(45) Date of Patent: Jun. 29, 2021

(54) SPLIT WIRELESS RADIO CHAINS TO SERVICE RANGING MEASUREMENT (71) Applicants: Hewlett Packard Enterprise Development LP, Houston, TX (US); Qiang Zhou, Sunnyvale, CA (US); Guangzhi Ran, Beijing (CN); Jianpo Han, Beijing (CN); Andre Beaudin, Montreal (CA); Shahnawaz Siraj, San Jose, CA (US)

(72) Inventors: Qiang Zhou, Sunnyvale, CA (US); Guangzhi Ran, Beijing (CN); Jianpo Han, Beijing (CN); Andre Beaudin, Montreal (CA); Shahnawaz Siraj, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/647,791

(22) PCT Filed: Sep. 28, 2017

(86) PCT No.: PCT/CN2017/103898
§ 371 (c)(1),
(2) Date: Mar. 16, 2020

(87) PCT Pub. No.: WO2019/061130
PCT Pub. Date: Apr. 4, 2019

(65) Prior Publication Data
US 2020/0217946 A1 Jul. 9, 2020

(51) Int. Cl.
*H04B 7/06* (2006.01)
*G01S 13/76* (2006.01)
(Continued)

(52) U.S. Cl.
CPC .......... *G01S 13/765* (2013.01); *H04B 7/0691* (2013.01); *H04W 84/12* (2013.01); *H04W 88/08* (2013.01)

(58) Field of Classification Search
CPC .............................. H04W 48/14; H04W 48/16
See application file for complete search history.

(56) References Cited

U.S. PATENT DOCUMENTS 8,948,139 B2    2/2015   Li et al.
9,404,993 B2    8/2016   Hahn et al.
(Continued)

FOREIGN PATENT DOCUMENTS

CN          103168501          6/2013

OTHER PUBLICATIONS

International Searching Authority, The International Search Report and the Written Opinion, dated Jun. 19, 2018, PCT/CN2017/103898, 9 Pgs.

(Continued)

*Primary Examiner* — Michael T Vu
(74) *Attorney, Agent, or Firm* — Hewlett Packard Enterprise Patent Department (57) ABSTRACT

An example system may include a plurality of wireless radio chains of a radio operating at a channel in a wireless network and a processor to receive a ranging measurement request for a client device not associated with the wireless network, split a subset of wireless radio chains from the plurality of the wireless radio chains, and use the subset of wireless radio chains to service the ranging measurement request.

9 Claims, 4 Drawing Sheets (51) Int. Cl.
*H04W 84/12* (2009.01)
*H04W 88/08* (2009.01)

(56) References Cited

U.S. PATENT DOCUMENTS

| | | |
|---|---|---|
| 9,551,775 B2 | 1/2017 | Rangarajan et al. |
| 2013/0208694 A1 | 8/2013 | Park et al. |
| 2014/0029566 A1 | 1/2014 | Choi et al. |
| 2015/0271829 A1 | 9/2015 | Amini et al. |
| 2016/0183113 A1 | 6/2016 | Dua et al. |
| 2016/0192138 A1 | 6/2016 | Amizur et al. |
| 2018/0011179 A1* | 1/2018 | Zhang .................... H04L 69/22 |
| 2020/0314220 A1* | 10/2020 | Segev .................... H04L 69/28 |

OTHER PUBLICATIONS

Mariakakis, A. et al.; "Sail: Single Access Point-based Indoor Localization"; Jun. 2014; 14 pages.

\* cited by examiner

SPLIT WIRELESS RADIO CHAINS TO SERVICE RANGING MEASUREMENT

BACKGROUND

In the IEEE 802.11 wireless network protocol, fine timing measurements are utilized to support ranging measurement requests between network devices and non-associated client devices. When a network device, such as an access point, performs a ranging measurement request, service to the client devices associated with the network device may be impacted.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

In the IEEE 802.11 wireless network protocol, fine timing measurements are utilized to support ranging measurement requests between network devices and non-associated client devices. When a network device, such as an access point, performs a ranging measurement request, service to the client devices associated with the network device may be impacted.

Examples described herein may utilize a network device capable of splitting a plurality of wireless radio chains of a radio to operate at a different channel. The network device may split the plurality of wireless radio chains into a first subset of wireless radio chains and a second subset of wireless radio chains. The first subset of wireless radio chains may service the ranging measurement request, while the second subset of wireless radio chains continue to service existing client devices. The network device may re-combine the first subset of wireless radio chains and second subset of wireless radio chains after the ranging measurement request is fulfilled. The network device may permanently split the plurality of wireless radio chains upon initialization. In the case of a permanently split first subset of wireless radio chains and second subset of wireless radio chains, the network device may utilize the first subset of wireless radio chains exclusively for ranging measurement requests. The first subset of wireless radio chains, for ranging measurement requests, may operate at a different channel than the second subset of wireless radio chains, for providing wireless access service for the client devices associated with the wireless network.

For example, a system may include a plurality of wireless radio chains of a radio operating at a channel in a wireless network and a processor. The processor may receive a ranging measurement request for a client device not associated with the wireless network. The processor may split a subset of wireless radio chains from the plurality of the wireless radio chains. The processor may use the subset of wireless radio chains to service the ranging measurement request.

Figure 1:
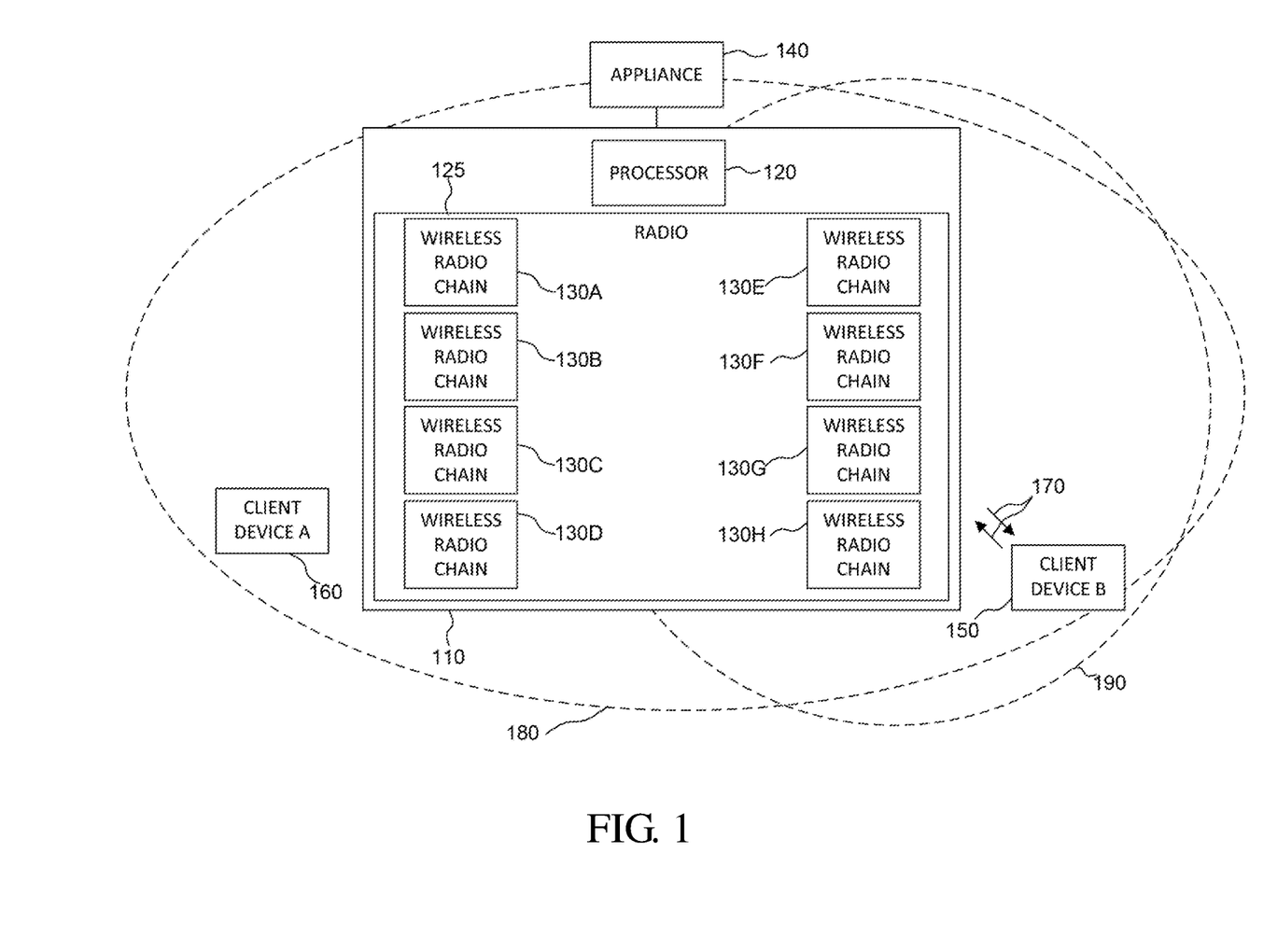
FIG. 1 is a block diagram of an example system including a processor and a radio with wireless radio chains.

FIG. 1 is a block diagram of an example system 110 including a processor 120 and a radio 125 with wireless radio chains 130. The system 110 may include a plurality of wireless radio chains 130 of a radio 125 operating at a channel in a wireless network 180. The processor 120 may receive a ranging measurement request for a client device not associated with the wireless network 180, for example, client device B 150. Also, the processor 120 may receive the ranging measurement request from an appliance 140. In an example, the appliance 140 may be an upper level appliance. In a further example, the upper level appliance is a server. In a further example, the server is an analytics and location engine (ALE) server. The processor 120 may also split a subset of wireless radio chains (for example, wireless radio chains 130E, 130F, 130G, and 130H) from the plurality of the wireless radio chains 130. The processor 120 may split the plurality of wireless radio chains 130 in response to the reception of the ranging measurement request. The processor 120 may split any number of wireless radio chains from the plurality of wireless radio chains 130. In another example, the processor 120 may split the plurality of wireless radio chains 130 and then switch a subset of wireless radio chains (for example, wireless radio chains 130E, 130F, 130G, and 130H) to the channel that the client device (for example, client device B 150) not associated with the wireless network 180 is operating in. Stated another way, the processor 120 may switch the subset of wireless radio chains (for example, wireless radio chains 130E, 130F, 130G, and 130H) to operate at a different channel than the normal operating channel of the original plurality of wireless radio chains 130. The processor 120 may also use the subset of wireless radio chains (for example, wireless radio chains 130E, 130F, 130G, and 130H) to service the ranging measurement request.

In an example, the system 110 may be an access point (AP). As used herein, 'AP' generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

The system 110 may include other components such as a machine-readable storage medium or memory. As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Any machine-readable storage medium described herein may be non-transitory.

As described above, the system 110 may include a processor 120. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

As used herein, "ranging measurement request" may be a function of the fine timing measurement (FTM) protocol which is part of the IEEE 802.11 wireless network protocol. A network device 110 may use the FTM protocol to measure the range or distance between a client device 150 and the network device 110 (e.g., an AP). For example, a ranging measurement request may include a request to perform ranging measurement of a client device 150. An appliance 140 may send the request to a network device 110 (e.g., an AP). The network device 110 (e.g., the AP) may then send an FTM request frame to a client device 150. The client device 150 may send an acknowledgment in response to the network device 110. The client device 150 may then send a number of FTM frames, sometimes referred to as FTM burst length. The number of FTM frames may vary. In response to receiving the FTM frames, the network device 110 (e.g., the AP) may send an acknowledgment to the client device 150. Once the FTM frames are sent and acknowledged, the network device 110 (e.g., the AP) can calculate the range between the network device 110 and the client device 150 using the round trip time (RTT) of the FTM frames and acknowledgments. While one example is given, there are other examples for measuring the distance between a network device 110 (e.g., the AP) and a client device 150 that may be utilized when referring to a ranging measurement request.

As described above, the system 110 may include a plurality of wireless radio chains 130 of a radio 125. The wireless radio chains 130 of the radio 125 may wirelessly send and/or receive data packets from other network devices. As used herein, 'network device' generally includes a device that is adapted to transmit and/or receive signaling and to process information within such signaling such as a station (e.g., any data processing equipment such as a computer, cellular phone, personal digital assistant, tablet devices, etc.), an AP, data transfer devices (such as network switches, routers, controllers, etc.) or the like. In some examples, the wireless radio chains 130 of the radio 125 can also be utilized to receive communication requests from a plurality of devices such as client device 160.

As used herein, 'transmit beamforming' (TxBF) may refer to a method of concentrating a signal from a system 110 to a client device 160. The method may utilize multiple wireless radio chains 130 of a radio 125 to concentrate the signal. For example, the system 110 may utilize wireless radio chains 130A, 130B, 130C, and 130D to focus the signal from the system 110 to client device 160. TxBF may utilize ether combinations of the wireless radio chains 130. The system 110 may or may not utilize TxBF. The system 110 may take into account various factors to determine whether to use TxBF, such as number of client devices, channels used, or whether a ranging measurement request is requested.

In another example, the plurality of wireless radio chains (such as wireless radio chains 130A, 130B, 130C, and 130D) not split for the ranging measurement request may continue to provide service to client devices 160 associated with the wireless network 180. In such examples, the system 110 may continue to offer wireless access services while ranging measurement requests are performed. In such examples, client devices 160 operating at a channel associated with the wireless network 180 may not experience degradation in wireless access services and may operate normally.

In another example, in response to the fulfillment of the ranging measurement request, the processor 120 may combine the subset of the wireless radio chains (such as wireless radio chains 130E, 130F, 130G, and 130H), back into the plurality of wireless radio chains 130. In an example, the processor 120 may split the plurality of wireless radio chains 130 in response to a ranging measurement request. In such examples, after the ranging measurement request is fulfilled, the subset of wireless radio chains (such as wireless radio chains 130E, 130F, 130G, and 130H) may no longer be in use. The processor 120 may switch the subset of wireless radio chains (such as wireless radio chains 130E, 130F, 130G, and 130H) back to the channel of the wireless network 180 and re-combine the subset of wireless radio chains 130E, 130F, 130G, and 130H with the plurality of wireless radio chains 130. In such examples, all wireless radio chains 130 may operate at the channel of the wireless network 180 and provide wireless access service, after the subset of wireless radio chains 130E, 130F, 130G, and 130H are re-combined with the plurality of wireless radio chains 130.

In another example, the system 110 may utilize TxBF. In such examples, in response to a ranging measurement request, the processor 120 of the system 110 may disable TxBF. The processor 120 may suspend TxBF to ensure that service to existing client devices 160 is not affected. In response to the fulfillment of the ranging measurement request, the processor 120 of the system 110 may re-enable TxBF. Once the full set of the plurality of wireless radio chains 130 is available, the processor 120 may re-enable TxBF. Stated another way, in response to the fulfillment of the ranging measurement request and re-combination of the subset of wireless radio chains 130E, 130F, 130G, and 130H with the plurality of radio chains 130, the processor 120 may re-enable TxBF.

Figure 2:
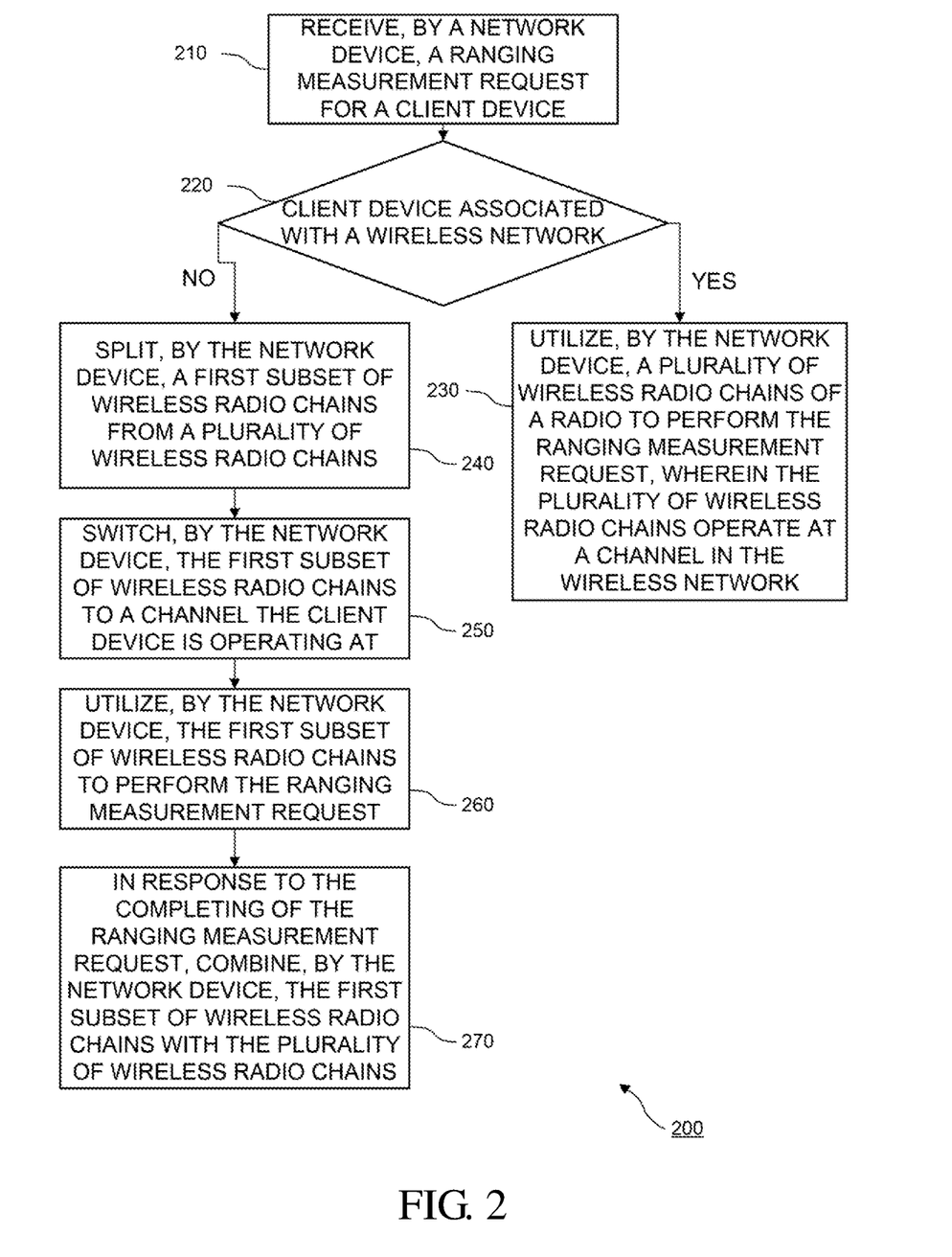
FIGS. 2-3 are flowcharts of example methods of splitting wireless radio chains to service ranging measurement requests.

FIG. 2 is a flowchart of an example method 200 of splitting wireless radio chains to service ranging measurement requests. Although execution of method 200 is described below with reference to system 110 of FIG. 1, other suitable systems for the execution of method 200 may be utilized. Additionally, implementation of method 200 is not limited to such examples.

At block 210, the networking device 110 may receive a ranging measurement request for a client device 150. An upper layer appliance 140 may send the ranging measurement request to the networking device 110. In an example, the upper layer appliance 140 may be a system running in a private or public cloud. In another example, the upper layer appliance may be a server. In a further example, the server may be an ALE server.

At block 220, the processor 120 of the network device 110 may determine whether a client device (such as, client device A 160 or client device B 150) may be associated with the wireless network 180 or not associated with the wireless network 180. If the client device (e.g., client device A 160) is associated with the wireless network 180 and operating at the same channel, then the plurality of wireless radio chains 130 will perform the ranging measurement request, as shown in block 230. If the client device (e.g., client device B 150) is not associated with the wireless network 180 and operating at a different channel in a different wireless network, such as wireless network 190, than the network device 110, then, at block 240, the network device 110 may split a first subset of wireless radio chains (such as, one of the wireless radio chains 130 or some combination thereof) from the plurality of wireless radio chains 130 of the network device 110.

In an example and as describe above, the processor 120 may split a number of wireless radio chains 130 greater than or equal to one for the first subset of wireless radio chains. In an example, the processor 120 may dynamically determine the amount of wireless radio chains to split from the plurality of wireless radio chains 130. In another example, the processor 120 may split one wireless radio chain from the plurality of wireless radio chains 130. In another example, the processor 120 may consider various factors when splitting wireless radio chains from the plurality of wireless radio chains 130. In such examples, the various factors may include the maximum number of wireless radio chains 130 supported by the network devices 110 associated client devices (such as client device A 160). For example, the network device 110 may support a maximum of four wireless radio chains 130 to support a client device (e.g. client device A 160). In such an example, the network device 110 may include eight wireless radio chains 130. Further, since the maximum number of wireless radio chains supported for client devices (e.g. client device A 160) may be four, the processor 120 may split no more than four of the eight wireless radio chains 130.

At block 250, the network device 110 may switch the first subset of wireless radio chains 130E, 130F, 130G, and 130H to the channel in the wireless network 190 that the client device B 150 is operating at. When the network device 110 switches the first subset of wireless radio chains 130E, 130F, 130G, and 130H, the first subset of wireless radio chains 130E, 130F, 130G, and 130H may communicate with client device B 150. In another example, the ranging measurement request may include the channel in the wireless network (for example, the channel in the wireless network 190) that the client device B 150 is operating at. Stated another way, an appliance 140 may include in the ranging measurement request the channel in the wireless network 190 that the client device B 150 is operating at. In another example, the ranging measurement request may include one client device to perform the ranging measurement on, such as client device B 150. In another example, the ranging measurement may include a list of client devices to perform the ranging measurement request on. In such examples, network device 110 may use the first subset of wireless radio chains (e.g., wireless radio chains 130E, 130F, 130G, and 130H) to service the ranging measurement request for the full list of clients.

At block 260, the network device 110 may utilize the first subset of wireless radio chains 130E, 130F, 130G, and 130H to perform the ranging measurement request. Once the first subset of wireless radio chains 130E, 130F, 130G, and 130H can communicate with client device B 150, then the network device 110 may use the first subset of wireless radio chains 130E, 130F, 130G, and 130H to send ranging measurement signals 170 to client device B 150. The network device 110 may receive corresponding ranging measurement signals 170 from client device B 150. Once the ranging measurement signals 170 are sent and received, the network device 110 may calculate the range or distance between the network device 110 and client device B 150. In another example, the ranging measurement request may include a list of client devices. In such examples, the network device 110 may use the first subset of wireless radio chains (e.g., wireless radio chains 130E, 130F, 130G, and 130H) to service the ranging measurement request for the full list of clients. In such examples, the network device 110 may perform the ranging measurement request in a sequential fashion. Stated another way, the network device 110 may perform the ranging measurement request for the client devices in the list one at a time and not simultaneously.

At block 270, in response to the completion of the ranging measurement request, the network device 110 may re-combine the first subset of wireless radio chains 130E, 130F, 130G, and 130H with the plurality of radio chains 130. In an example, the network device 110, in response to the completion of the ranging measurement request, may check for additional ranging measurement requests. In such examples, the network device 110, may re-combine the first subset of wireless radio chains 130E, 130F, 130G, and 130H with the plurality of radio chains 130 if no additional ranging measurement requests remain. In an example, the network device 110 may switch the first subset of wireless radio chains 130E, 130F, 130G, and 130H to the channel operating in the wireless network 180. In a further example, the network device 110 may enable the first subset of wireless radio chains 130E, 130F, 130G, and 130H (along with the rest of the plurality of wireless radio chains 130A, 130B, 130C, and 130D) to perform normal operations, such as provide wireless access service to client devices (such as client device A 160) operating at the channel in the wireless network 180.

In another example, the network device 110 may continue to provide wireless access service during the calculation of the ranging measurement request. The remaining wireless radio chains (such as, 130A, 130B, 130C, and 130D not split for the ranging measurement request may continue to provide wireless access service or other normal operations. In a further example and as described above, the network device 110 may temporarily suspend transmit beamforming (TxBF) during the calculation of the ranging measurement request. In such examples, in response to the fulfillment of the ranging measurement request, the network device 110 may re-combine the subset of wireless radio chains 130E, 130F, 130G, and 130H and the subset of wireless radio chains 130A, 130B, 130C, and 130D. In another example, in response to the fulfillment of the ranging measurement request and re-combination of the wireless radio chains 130, the network device 110 may re-enable TxBF.

Figure 3:
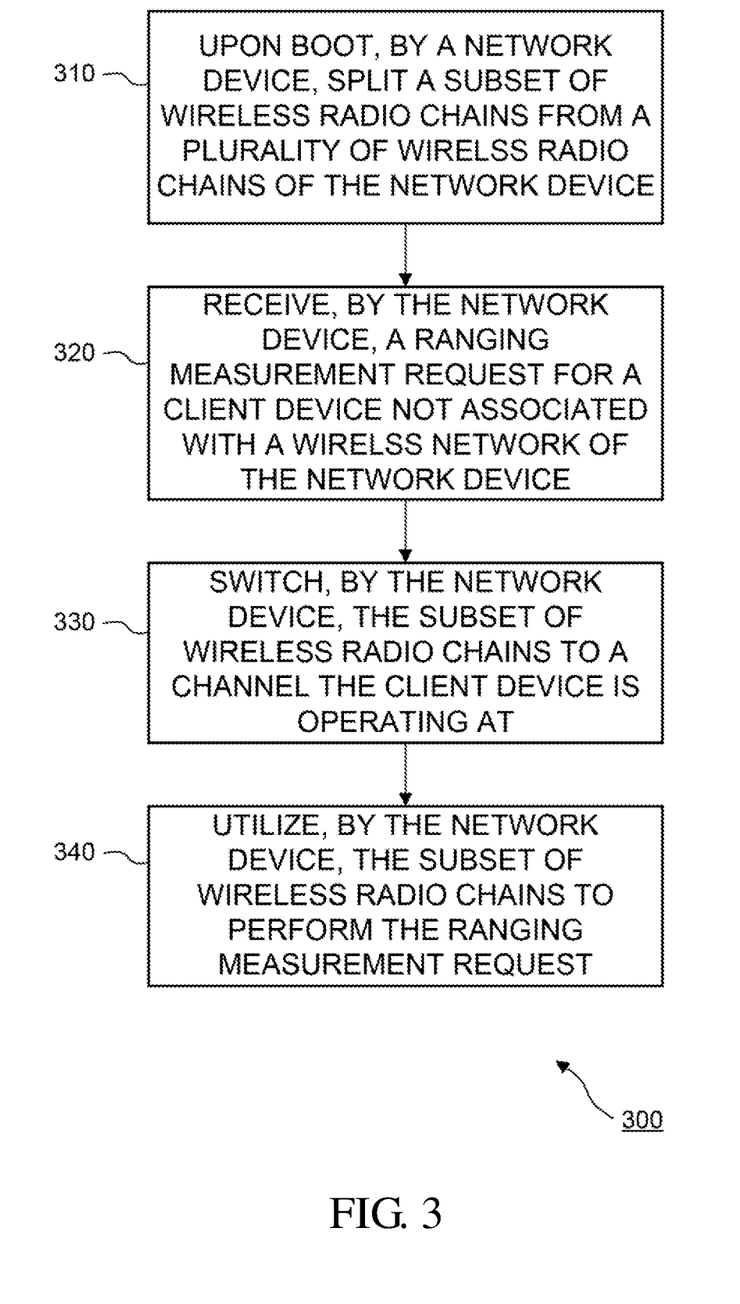

FIG. 3 is a flowchart of another example method 300 of splitting wireless radio chains to service ranging measurement. Although execution of method 300 is described below with reference to system 100 of FIG. 1, other suitable systems for the execution of method 300 may be utilized. Additionally, implementation of method 300 is not limited to such examples.

At block 310, upon boot, a network device 110 may split a first subset of wireless radio chains 130E, 130F, 130G, and 130H from a plurality of wireless radio chains 130 of the network device 110. In another example and as described above, the network device 110 may split the first subset of wireless radio chains 130E, 130F, 130G, and 130H in response to a ranging measurement request from an appliance 140. The first subset of wireless radio chains 130E, 130F, 130G, and 130H may be utilized for ranging measurement requests, while the remaining subset of the plurality of wireless radio chains 130A, 130B, 130C, and 130D may be utilized for wireless access service or other normal operations for client devices (such as client device A 160).

At block 320, the network device 110 may receive a ranging measurement request for client device B 150 not associated with a wireless network 190 of the network device 110. In another example, the network device 110 may also receive a ranging measurement request for client device A 160 that is associated with the wireless network 180 of the network device 110. In an example, in response to the reception of a ranging measurement request for a client device (such as client device A 160) associated with the wireless network 180, the network device 110 may not switch the channel of the first subset of wireless radio chains 130E, 130F, 130G, and 130H.

At block 330, the network device 110 may switch the subset of wireless radio chains 130E, 130F, 130G, and 130H to a channel of the wireless network 190 that the client device (such as client device B 150) is operating at. As described above, client device B 150 may operate at a channel in a wireless network 190 that is different than the channel in a wireless network 180 that the plurality of wireless radio chains 130 normally operate at. In such cases, the network device 110 may switch the channel of the subset of wireless radio chains 130E, 130F, 130G, and 130H to enable communication with the client device (such as client device B 150), so that the network device 110 may fulfill the ranging measurement request.

At block 340, the network device 110 may utilize the subset of wireless radio chains 130E, 130F, 130G, and 130H to perform the ranging measurement request. In an example, after the ranging measurement request is fulfilled, the network device 110 may not re-combine the subset of wireless radio chains 130E, 130F, 130G, and 130H with the remaining plurality of wireless radio chains 130A, 130B, 130C, and 130D. In such examples, the network device may permanently split the subset of wireless radio chains 130E, 130F, 130G, and 130H. In such examples, the network device 110 may utilize the subset of wireless radio chains 130E, 130F, 130G, and 130H to perform ail ranging measurement requests. In another example and as described above, the network device 110 may re-combine the subset of wireless radio chains 130E, 130F, 130G, and 130H with the plurality of wireless radio chains 130.

Figure 4:
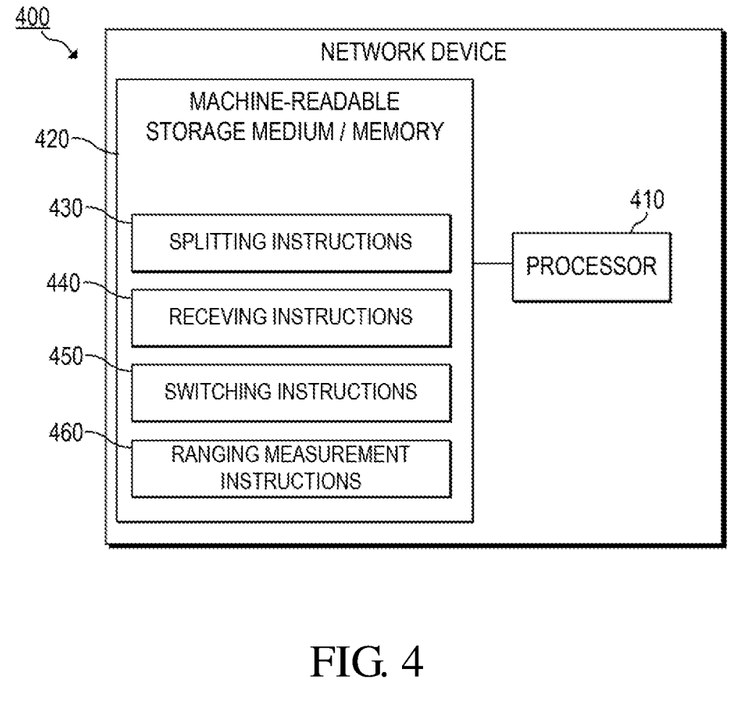
FIG. 4 is a block diagram of a networking device capable of splitting wireless radio chains to service ranging measurement requests.

FIG. 4 is a block diagram of a network device 400 capable of splitting wireless radio chains to service ranging measurement requests. As described above, the network device 400 may include a machine-readable storage medium or memory 420 and a processor 410. The machine-readable storage medium 420 may store machine-readable instructions executable by the processor 410. The machine-readable instructions may include instructions to split wireless radio chains 430. In response to a ranging measurement request, the processor 410 may execute instructions 430 to split the wireless radio chains. The instructions 430 may include instructions to split one or more wireless radio chains from a plurality of wireless radio chains, the split wireless radio chains to be utilized for the ranging measurement request. In another example, the processor 410 executes the splitting instructions 430 in response to boot of the networking device 400. In another example, the processor 410 executes the splitting instructions 430 in response to initialization of the networking device 400. In another example, the processor 410 executes the splitting instructions 430 in response to input from an administrator.

The machine-readable instructions may also include instructions 440 to receive a ranging measurement request. An upper layer appliance may send the ranging measurement request to the network device 400. The upper layer appliance may send the ranging measurement request before or after the first subset of wireless radio chains is split. The ranging measurement request may include a request to measure the range or distance between the network device 400 and either one or multiple client devices. The client devices may or may not be associated with the network device 400. The client devices may or may not be operating at the same channel as the network device 400.

The machine-readable instructions may also include instructions 450 to switch the first subset of wireless radio chains to the channel that the client devices in the ranging measurement request are operating at. Stated another way, the ranging measurement request may include client devices not operating at the same channel as the network device. When the network device 400 receives such a ranging measurement request, the processor 410 may execute the instructions 450 to switch the channel of the subset of wireless radio chains. If the channel of the subset of the wireless radio chains is already set to the proper channel, then the processor 410 may not execute the switching instructions 450. In the case where the channel is different, then the processor 410 may execute the switching instructions 450.

The machine-readable instructions may include instructions 460 to perform a ranging measurement request. As described above, the network device 400 may receive a ranging measurement request. In response to the ranging measurement request and as described above, the network device 400 may split wireless radio chains. After the wireless radio chains are split (or if they were already split) and are set to the proper channel, the processor 410 may execute the instructions 460 to perform the ranging measurement request. As described above, the ranging measurement request is a function associated with the 802.11 standard and FTM protocol.

As noted above, the processor 410 may execute instructions 460 to perform the ranging measurement request. The machine-readable storage medium 420 may also include instructions that the processor 410 may execute in response to the fulfillment of the ranging measurement request. The machine-readable instructions may include instructions to re-combine the subset of wireless radio chains with the plurality of wireless radio chains. In an example, the network device 400 may dedicate the subset of wireless radio chains for ranging measurement requests. In such examples, instructions to re-combine the subset of wireless radio chains with the plurality of wireless radio chains may not be included in the machine-readable storage medium 420.

The machine-readable instructions may also include instructions to suspend TxBF. The processor 410 may execute instructions that suspend TxBF upon reception of the ranging measurement request. In response to the fulfillment of the ranging measurement request and re-combination of the subset of wireless radio chains with the plurality of wireless radio chains, the processor 410 may execute instructions to re-enable TxBF. In the case of a dedicated subset of wireless radio chains for ranging measurement requests, the machine-readable storage medium may not include instructions to suspend TxBF.

Although the flow diagrams of FIGS. 2-3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be examples. Structure and acts described herein are replaceable by equivalents, which perform the same function, even if the structure or acts are different, as known in the art. Therefore, the scope of the present disclosure is limited only by the elements and limitations as used in the claims.

The invention claimed is:

1. A method comprising:
receiving, by a network device, a ranging measurement request for a client device;
in response to the client device being associated with a wireless network, utilizing, by the network device, a plurality of wireless radio chains of a radio to perform the ranging measurement request, wherein the plurality of wireless radio chains operate at a channel in the wireless network;
in response to the client device not being associated with the wireless network, splitting, by the network device, a first subset of wireless radio chains from the plurality of wireless radio chains;
switching, by the network device, the first subset of wireless radio chains to a channel the client device is operating at;
utilizing, by the network device, the first subset of wireless radio chains to perform the ranging measurement request; and
in response to completing the ranging measurement request, combining, by the network device, the first subset of wireless radio chains with the plurality of wireless radio chains,
wherein a second subset of the plurality of wireless radio chains continues to provide wireless access service during calculating the ranging measurement request, wherein the second subset includes no wireless radio chain from the first subset of wireless radio chains.

2. The method of claim 1, further comprising:
suspending, during calculating the ranging measurement request, by the network device, transmit beamforming (TxBF) for channel sounding and data transmission.

3. The method of claim 2, further comprising:
in response to completing the ranging measurement request and combining the first subset of wireless radio chains with the plurality of wireless radio chains, enabling, by the network device, TxBF for the channel sounding and the data transmission.

4. A system comprising:
a plurality of wireless radio chains of a radio operating at a channel in a wireless network;
a processor to:
receive a ranging measurement request for a client device;
in response to the client device being associated with the wireless network, utilizing the plurality of wireless radio chains of a radio to perform the ranging measurement request, wherein the plurality of wireless radio chains operate at a channel in the wireless network;
in response to the client device not being associated with the wireless network, splitting a first subset of wireless radio chains from the plurality of wireless radio chains;
switching the first subset of wireless radio chains to a channel the client device is operating at;
utilizing the first subset of wireless radio chains to perform the ranging measurement request; and
in response to completing the ranging measurement request, combining the first subset of wireless radio chains with the plurality of wireless radio chains,
wherein a second subset of the plurality of wireless radio chains continues to provide wireless access service during calculating the ranging measurement request, wherein the second subset includes no wireless radio chain from the first subset of wireless radio chains.

5. The system of claim 4, further comprising:
suspending, during calculating the ranging measurement request transmit beamforming (TxBF) for channel sounding and data transmission.

6. The system of claim 5, further comprising:
in response to completing the ranging measurement request and combining the first subset of wireless radio chains with the plurality of wireless radio chains, enabling TxBF for the channel sounding and the data transmission.

7. A non-transitory machine-readable storage medium encoded with instructions executable by at least one processor of a network device, the machine-readable storage medium comprising instructions to:
receive a ranging measurement request for a client device;
in response to the client device being associated with the wireless network, utilizing the plurality of wireless radio chains of a radio to perform the ranging measurement request, wherein the plurality of wireless radio chains operate at a channel in the wireless network;
in response to the client device not being associated with the wireless network, splitting a first subset of wireless radio chains from the plurality of wireless radio chains;
switching the first subset of wireless radio chains to a channel the client device is operating at;
utilizing the first subset of wireless radio chains to perform the ranging measurement request; and
in response to completing the ranging measurement request, combining the first subset of wireless radio chains with the plurality of wireless radio chains,
wherein a second subset of the plurality of wireless radio chains continues to provide wireless access service during calculating the ranging measurement request, wherein the second subset includes no wireless radio chain from the first subset of wireless radio chains.

8. The non-transitory machine-readable storage medium of claim 7, further comprising instructions to:
suspending, during calculating the ranging measurement request transmit beamforming (TxBF) for channel sounding and data transmission.

9. The non-transitory machine-readable storage medium of claim 8, further comprising instructions to:
in response to completing the ranging measurement request and combining the first subset of wireless radio chains with the plurality of wireless radio chains, enabling TxBF for the channel sounding and the data transmission.

* * * * *